Aug. 19, 1952  R. F. GARNER  2,607,529
COMBINED THERMOSTAT AND AUTOMATIC PILOT CONTROL
Filed June 11, 1949  4 Sheets-Sheet 1

INVENTOR.
RUSSELL F. GARNER
BY
Albert J. Henderson
ATTORNEY

INVENTOR.
RUSSELL F. GARNER
BY
Albert J. Henderson
ATTORNEY

INVENTOR.
RUSSELL F. GARNER
BY
ATTORNEY

Aug. 19, 1952          R. F. GARNER          2,607,529
COMBINED THERMOSTAT AND AUTOMATIC PILOT CONTROL
Filed June 11, 1949          4 Sheets-Sheet 4

INVENTOR.
RUSSELL F. GARNER
BY
Albert J. Henderson
ATTORNEY

Patented Aug. 19, 1952

2,607,529

UNITED STATES PATENT OFFICE 2,607,529

COMBINED THERMOSTAT AND AUTOMATIC PILOT CONTROL

Russell F. Garner, Youngwood, Pa., assignor to Robertshaw-Fulton Controls Company, Greensburg, Pa., a corporation of Delaware Application June 11, 1949, Serial No. 98,584

4 Claims. (Cl. 236—1)

This invention relates to combination controls for gaseous fuel burners wherein the temperature controlling device and the pilot cut-off both operate upon a single control valve. In this respect the device is similar to that disclosed in U. S. Patent No. 2,361,945 to W. F. Jackson wherein the automatic pilot control embodied thermomagnetic means responsive to extinguishment of the pilot flame for causing the control valve to close in the event it was being held open by the thermostat.

The present invention is particularly adapted, although not limited, for use with gas burning space heaters and the like whereby room temperatures may be controlled within precise limits. The thermally responsive element is preferably of the hydraulic type which lends itself with the utmost flexibility to a variety of different installations. Adjustment for the desired temperature setting is made from the front panel of the control with the object of facilitating such operation by the user. Moreover, the majority of features found advantageous in prior devices of this general type are retained in this invention.

Thus, in addition to the foregoing objects the present embodiment provides for automatic shut-off of the main burner fuel in the event of pilot flame failure; the single valve for dual control purposes which is not subjected to damage when the automatic shut-off occurs; a safeguard against sticking valves which may occur where a separate cut-off valve is provided and infrequently operated; and the safe lighting feature provided by preventing flow of fuel to the main burner during the resetting operation.

With these and other objects and advantages in view the invention is embodied in the combined thermostat and automatic pilot control by including in a single casing the main fuel shut-off cock and the pilot fuel valve together with the single control valve operable by both the thermoelectric pilot control and the room thermostat. The thermal element is operable through a lever device on one side of the control valve while the thermoelectric pilot control is likewise operable thereon through a lever device but from the opposite side of this valve. The thermostat lever is normally biased for opening the control valve but operation of the hydraulic element will overcome this bias upon the set temperature being reached. However, since the pilot control may operate automatically due to extinguishment of the pilot burner flame the control valve may at any time be closed irrespective of the condition of the thermal element.

Main shut-off cock

Figure 1:
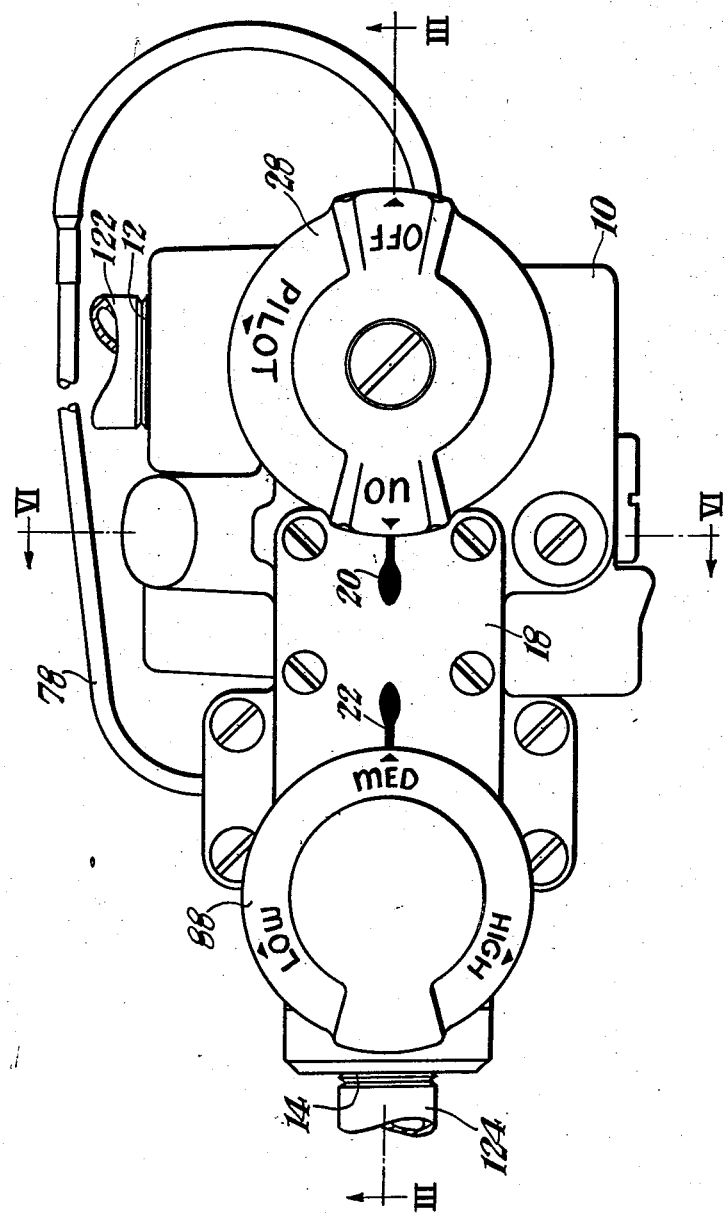
Fig. 1 is a plan view of the control device of this invention.
Figure 2:
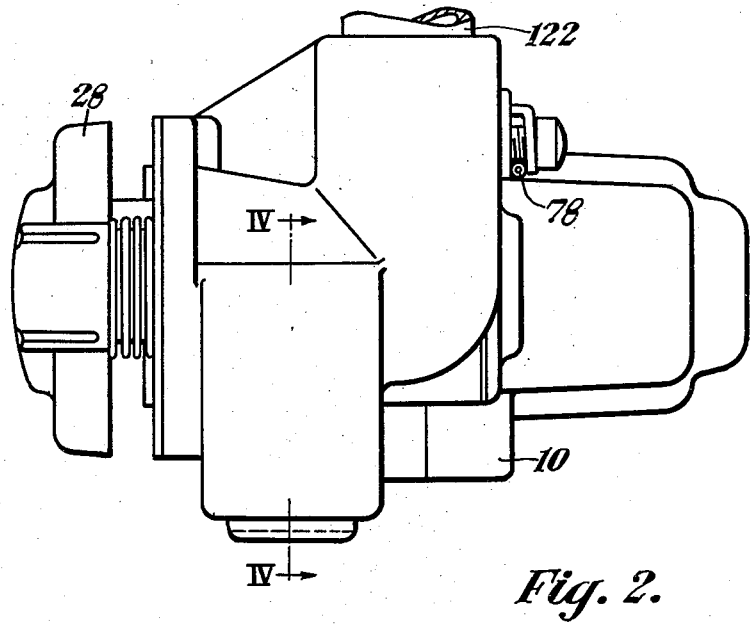
Fig. 2 is a side elevation.

Referring more particularly to the drawings, the control device comprises a casing 10 provided at one end with a lateral inlet opening 12 for fuel and at the other end with an outlet opening 14. The front face of the casing 10 is recessed to provide a valve chamber 16 intermediate the inlet 12 and outlet 14 and communicating at either end therewith. A front panel 18 is secured over the recessed valve chamber 16 and carries registry points 20, 22 for a purpose which will be apparent hereinafter.

The passage of fuel, such as gas, between the inlet 12 and the valve chamber 16 is under control of a main shut-off cock 24. The cock 24 may be of the type disclosed in the aforementioned patent and provided with an angular port 26 which is movable upon rotation of the cock 24 by the usual knob 28 to open and close communication between the inlet 12 and the valve chamber 16. The knob 28 carries indicia for the "on," "off" and "pilot" positions of the main shut-off cock 24 and which are adapted to register selectively with the registry point 20 upon rotation of the cock 24.

The knob 28 is furthermore adapted for axial movement relative to the cock 24 and is provided on its underside with a substantially angular recess 30 which, however, is interrupted by an unrecessed or land portion 31 opposite the indicia "Pilot." A plunger 32 projects through the casing 10 and the front panel 18 from the valve chamber 16 and is adapted to be engaged by the land portion 32 upon axial movement of the knob 28 in the pilot position. The plunger 32 is biased outwardly of the casing 10 by a coil spring 34 but, due to the provision of the recess 30 in the underside of the knob 28, the described engage-

Pilot valve

Figure 5:
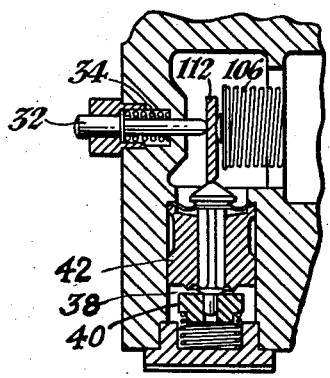
Fig. 5 is a partial sectional view taken on the line V—V of Fig. 4.
Figure 4:
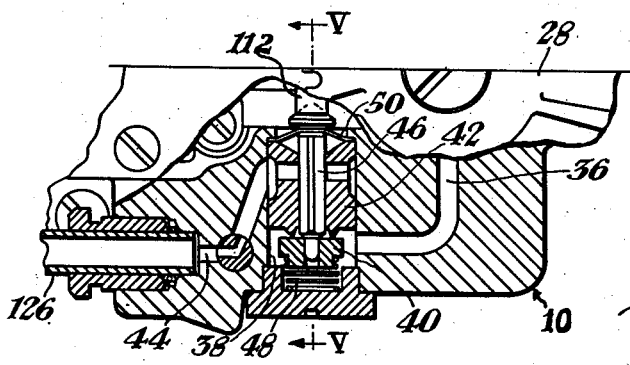
Fig. 4 is a partial sectional view taken on the line IV—IV of Fig. 2.

As shown more clearly in Figs. 4 and 5, the casing 10 is provided with a pilot passage 36 which communicates at one end with the main shut-off cock 24 and with a pilot valve chamber 38 at the opposite end. Thus, passage of fuel to the pilot valve chamber 38 is under control of the shut-off cock 24 and can only occur when the latter is in the "pilot" or "on" positions indicated on the knob 28. The construction for accomplishing such passage of fuel to the pilot valve chamber 38 is fully described and shown in the aforementioned patent and further description herein is considered unnecessary.

A pilot valve member 40 is mounted for axial movement in the chamber 38 to open and close a passage through a valve seat member 42 which is supported in the chamber 38. An outlet passage 44 communicates with the passage in the valve seat member 42 and thus receives a supply of fuel from the inlet 36 when the valve member 40 is in open position. Movement of the pilot valve member 40 between open and closed positions is effected by operation of a valve stem 46 which projects through the passage in the valve seat member 42 and is suitably fluted or noncircular to permit passage of fuel thereby. The valve member 40 is biased by a coil spring 48 to closed position relative to the valve seat 42 and the usual sealing diaphragm 50 is provided for the operating end of the stem 46 to prevent leakage of fuel from the chamber 38.

Control valve mechanism

An annular valve seat member 52 is formed in the casing 10 in position to intersect the passage of fuel from the inlet 12 to the outlet 14 through the valve chamber 16. An axial hollow boss 54 is formed within the annular valve seat 52 and provides a bearing for a hollow valve stem 56 for relative slidable movement thereof. A disc valve member 58 is mounted on the valve stem 56 for movement therewith between open and closed positions relative to the valve seat 52. The valve member 58 is normally biased toward the valve seat 52 by means to be described more fully hereinafter.

The hollow valve stem 56 contains an override mechanism comprising a plunger 60 and biasing spring 62 which serves to urge a collar 64 on the plunger 60 into engagement with a bushing 66 closing the inner end of the hollow valve stem 56. The plunger 60 projects through the bushing 66 for operative engagement with the amplifying levers 68 of a clicker mechanism of well-known form including a thrust element 70 which serves to impart snap action movement to the valve member 58. The thrust element 70 carries valve operating means 72 which project from the casing 10 to the exterior thereof for operation by mechanism now to be described.

Temperature regulation

Thermally responsive means for operating the valve member 58 through the clicker disc mechanism 68—72 is provided and is housed within a thermostat housing 74 which is secured to the exterior of the casing 10. The thermal element includes an actuating device in the form of a bellows 76 which is movable in a path substantially parallel with the valve member 58. The usual capillary tubing 78 is connected at one end to the head 80 of the bellows 76 and projects from the housing 74 for connection to a bulb 82 at its exterior end. As is customary in hydraulic thermal elements of the type described, the bulb 82, capillary tube 78 and bellows 76 contain a thermally expansive fluid which will serve to expand the bellows 76 in response to increased temperatures sensed by the bulb 82.

Figure 3:
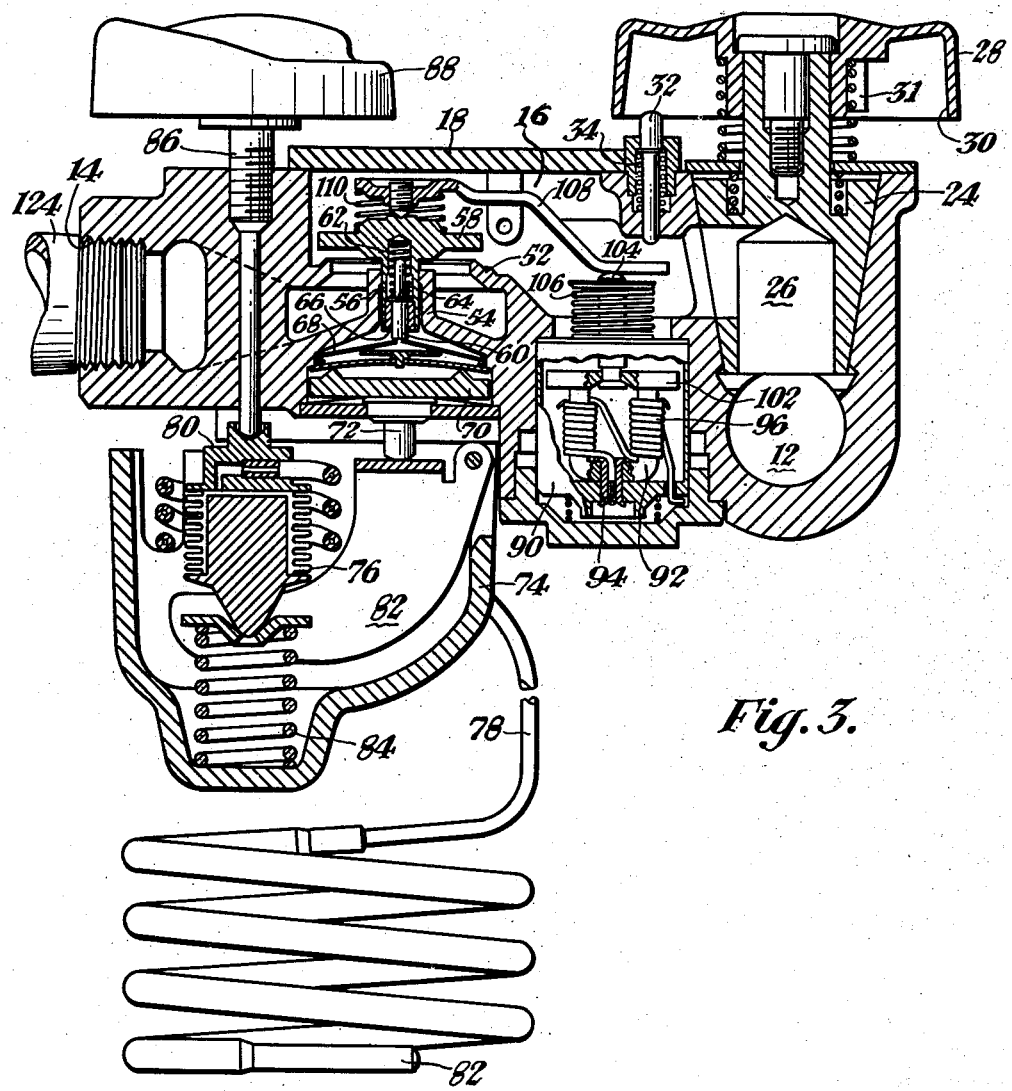
Fig. 3 is a longitudinal sectional view taken on the line III—III of Fig. 1.

The bellows 76 is supported on one arm of a pivoted lever device 82 which is biased into engagement therewith by a coil spring 84. The same arm of the lever 82 which engages the bellows 76 also engages the operating element 72 for the valve member 58. Consequently, clockwise movement of the lever 82 as viewed in Fig. 3 of the drawings under bias of the spring 84 will serve to retain the bellows 76 in a collapsed condition and also retain the lever 82 in operative engagement with the operating means 72.

The thermally responsive means is adapted to be adjusted from the front of the casing 10 to set the temperature at which the valve 58 will be operated. The adjusting means takes the form of a stem 86 which threadedly engages the casing 10 and extends therethrough into operative engagement with the head 80 of the bellows 76. The stem 86 carries on its projecting end the usual dial 88 carrying indicia "Low," "Medium" and "High" for selective registry with the registry point 22 on the front panel 18.

Automatic pilot control

Figure 6:
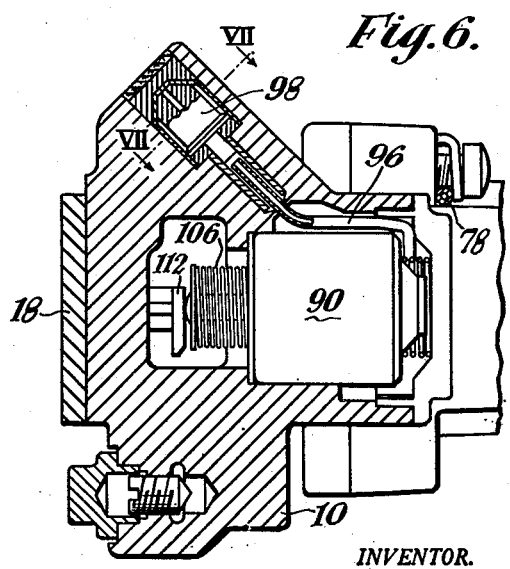
Fig. 6 is a partial cross section taken on the line VI—VI of Fig. 1.
Figure 7:
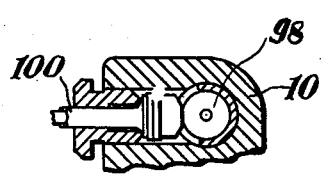
Fig. 7 is a partial sectional view taken on the line VII—VII of Fig. 6.

Thermoelectric means are provided for moving the valve member 58 to closed position upon the occurrence of certain conditions to be described and irrespective of the thermal condition of the thermal element 76—82. To this end, the casing 10 intermediate the main shut-off cock 24 and the control valve 58 is recessed for the reception of a magnet housing 90. An electromagnet comprising a horseshoe frame 92 is seated on its base at one end of the magnet housing 90 and is secured thereto by a hollow rivet 94 extending through these members. The usual winding 96 has one end secured in the hollow rivet 94 to provide a ground connection as will be apparent hereinafter. The opposite end of the winding 96 extends through an aperture in the cover 90 to the exterior thereof and, as shown more clearly in Fig. 6, is secured in a socket 98 with which one end of a thermocouple 100 makes good electrical connection as shown in the detail view in Fig. 7.

An armature 102 is supported within the magnet housing 90 on an armature stem 104 which projects to the exterior thereof into the valve chamber 16. The armature 102 is cooperable with the pole faces of the horseshoe magnet 92 for movement between attracted and released positions relative thereto. Thus, the armature 102 is positioned for movement in a path substantially parallel with the valve member 58 and is normally biased to its released position by a coil spring 106 which is operative between the armature stem 104 and the housing 90.

As is well known, the electrical energy generated by the thermocouple 100 responsive to heating thereof will be insufficient to attract the armature 102 from its released position, but will be sufficient to hold the same in attracted position after the usual resetting operation has been conducted. Consequently, manual resetting means including the plunger 32 previously described is employed to conduct the resetting operation. To this end, a lever device 108 is pivoted intermediate its ends in the valve chamber 16 and has one end positioned between the armature stem 104 and the plunger 32. The opposite end of the lever device 108 overlies the valve member 58 and a coil spring 110 extends between these members. Thus, the lever device 108 is normally biased into engagement with the armature stem 104 but insufficiently to overcome the bias of the armature stem spring 106 unless the plunger 32 is manually operated to its depressed position.

The lever device 108 is provided with a projection 112 on the arm which engages the armature stem 104. This projection 112, as shown more clearly in Figs. 4-6, is adapted to engage and operate the pilot valve stem 46 for moving the pilot valve member 40 to open position when the plunger 32 is depressed.

Operation

Figure 8:
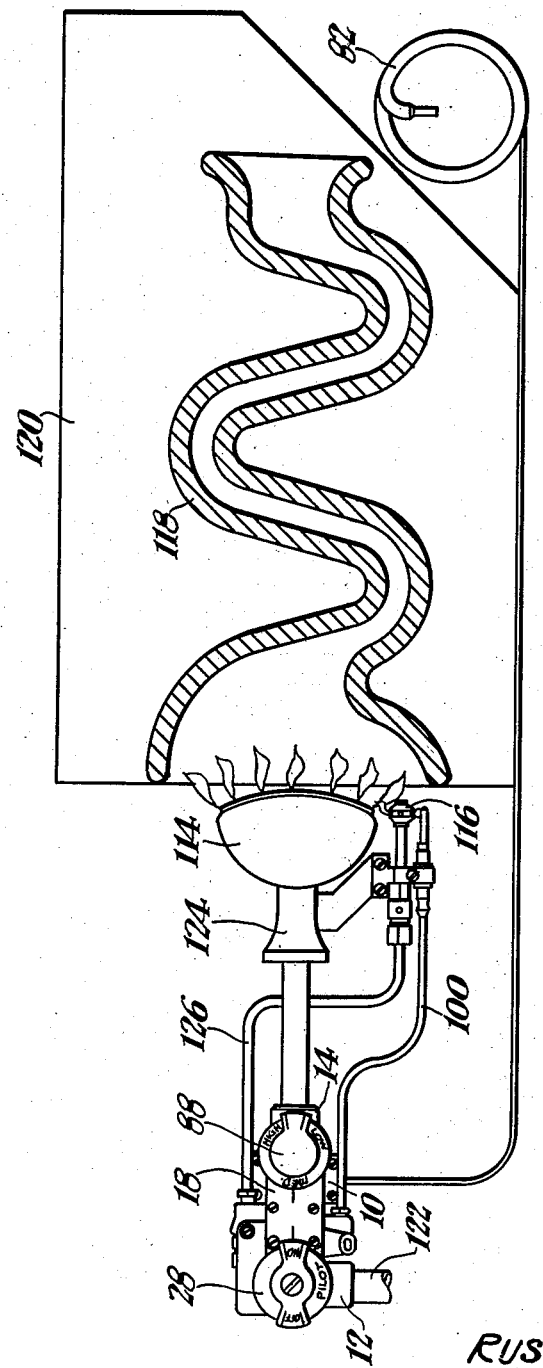
Fig. 8 is a schematic view showing the control device on a reduced scale in position on a burner installation.

The operation of the device will be described in connection with Fig. 8 of the drawings, wherein is shown a space heater installation comprising a main burner 114 having a pilot burner 116 in lighting proximity thereto and also positioned for heating the hot junction of the thermocouple 100. The heat of the main burner 114 is conducted through the usual baffles 118 positioned in the space heater housing 120 as illustrated schematically in the drawings. The bulb 82 of the thermostat is positioned in any convenient location in the space to be heated and is shown as being supported on the frame of the housing 120 where it will be protected from accidental blows or other damage. The inlet 12 on the control casing 10 is connected to a fuel supply pipe 122 while the outlet 14 is connected to a supply pipe 124 for the main burner 114. A pilot conduit 126 serves to connect the pilot burner 116 to the outlet passage 44 from the pilot valve 42.

The control device is placed in operative condition by manual operation when the knob 28 is rotated to "pilot" position and pushed in axially to engage the plunger 32 with the adjacent arm of the lever 108. Such operation will unseat the pilot valve member 40 by means of the projection 112 on the lever device 108 and also move the armature 102 to its attracted position by axial movement of the armature stem 104. It should be observed that in the "pilot" position of the main fuel cock 24, the angular port 26 does not place the inlet 12 in communication with the valve chamber 16 but merely in communication with the pilot passage 36 as fully described in the aforementioned patent.

The fuel issuing from the pilot burner 116 is then lighted and the hot junction of the thermocouple 100 becomes heated. As soon as the thermocouple 100 develops sufficient current to energize the winding 96 of the electromagnet then manual pressure on the knob 98 can be released and the armature 102 will be retained in its attracted position. The knob 28 is then rotated to the "on" position, as shown in the drawings, thus bringing the port 26 into open position for passage of fuel to the valve chamber 16.

The dial 88 may be adjusted to the desired temperature setting (shown as medium in the drawings). Operation of the dial 88 from "low" to "medium" position will be in a counterclockwise direction and will serve to withdraw the stem 86 slightly from the casing 10. As the bellows 76 is under bias of the coil spring 84, a corresponding axial movement of the bellows 76 will occur accompanied by a clockwise rotation of the lever 82 also under bias of the coil spring 84. As the coil spring 84 is stronger than the valve spring 110, the lever 82 is enabled to exert a thrust upon the valve operating stem 72 and, assuming that the room temperature is below the dial setting, the valve member 58 will be snapped to its open position by operation of the clicker mechanism.

Flow of fuel through the outlet 14 to the main burner 114 can then occur and this burner becomes ignited from the pilot burner 116. Heating of the space to the required temperature then continues until the bulb element 82 responds to the increased temperature. The fluid contained in the hydraulic thermal element consequently expands and causes a corresponding expansion of the bellows 76 in a well-known manner. Such expansion overcomes the bias of the coil spring 84 and causes a counterclockwise movement of the lever 82. As the lever 82 can no longer retain its operative engagement with the valve operating stem 72, the bias of the valve spring 110 serves to close the valve member 58 against its seat 52 by reversing the position of the clicker mechanism with a snap action. As soon as the temperature sensed by the bulb 82 drops below that for which the thermostat has been set, then the position of the parts is reversed and the valve member 58 resumes its open position as previously described.

In the event that the pilot burner 116 is extinguished then the thermocouple 100 ceases to generate current causing deenergization of the electromagnet 92 and movement of the armature 102 away from the pole faces thereof. Such release of the armature 102 is due to the bias of the armature spring 106 and serves to pivot the lever 108 in a counterclockwise direction. Should the valve member 58 at that time be in open position, then the bias of the override spring 62 is overcome and the hollow valve stem 56 moves axially of the plunger 60 without causing reverse operation of the clicker mechanism as in normal thermostatic valve operation. The valve member 58 now being engaged with the seat 52 flow of fuel to the main burner is shut-off. Since the lever 108 has been rotated counterclockwise by the spring 106 then the projection 112 no longer engages the pilot valve stem 46. Provision for shut-off of fuel to the pilot burner 116 also is thus made so that the 100 per cent shut-off feature is retained in this invention.

It will be understood that many changes may be made in the details of construction and arrangements of parts without departing from the scope of this invention.

I claim:

1. A combined thermostat and automatic pilot control comprising in combination: a casing having inlet and outlet passages; a valve seat intersecting said passages; a control valve member movable between open and closed positions relative to said seat and being biased to said closed position; an electromagnet having an armature positioned for movement between attracted and released positions in a path substantially parallel with the path of movement of said valve member, said electromagnet being positioned laterally of said valve member; a lever extending between said armature and said valve member for holding the latter in said closed position when said armature is in the released position and being ineffective in the attracted position thereof; a snap action actuator for said valve member, said actuator having at least a portion thereof extending from said casing; means positioned exterior of said casing and providing an expansible and collapsible chamber with a movable end wall positioned laterally of said actuator to be movable in a path substantially parallel with that of said valve member, said means being responsive to temperatures at a remote point; a housing carried by said casing for shielding said chamber; and a lever in said housing operatively associated with said actuator and said movable end wall for transmitting mechanical movement therebetween.

2. A combined thermostat and automatic pilot control as claimed in claim 1 wherein said temperature responsive means includes a capillary tube and bulb forming a closed system with said chamber, said chamber being expansible in response to temperature increases at said bulb for operating said last named lever to a position where said valve member is closed.

3. A combined thermostat and automatic pilot control as claimed in claim 1 wherein means is provided for adjusting said chamber relative to said last named lever to set the temperature at which said actuator will move said valve member.

4. A combined thermostat and automatic pilot control as claimed in claim 3 wherein said actuating means includes a shaft extending through said casing, said shaft being axially adjustable along a path substantially parallel with that of said valve member.

RUSSELL F. GARNER.

REFERENCES CITED

The following references are of record in the file of this patent:

UNITED STATES PATENTS

| Number | Name | Date |
|---|---|---|
| 2,267,347 | Betz | Dec. 23, 1941 |
| 2,319,685 | Jackson et al. | May 18, 1943 |
| 2,383,401 | Mantz | Aug. 21, 1945 |